United States Patent [19]

Varga

[11] Patent Number: 4,587,845
[45] Date of Patent: May 13, 1986

[54] LIQUID LEVEL SIGHT GAUGE

[75] Inventor: Otto H. Varga, Bradford-on-Avon, Great Britain

[73] Assignee: Seetru Ltd., Bristol, England

[21] Appl. No.: 661,220

[22] Filed: Oct. 15, 1984

[30] Foreign Application Priority Data

Oct. 27, 1983 [GB] United Kingdom ............... 8328664

[51] Int. Cl.[4] .......................................... G01F 23/02
[52] U.S. Cl. ..................................... 73/325; 250/577; 350/97
[58] Field of Search ............... 73/323, 326, 321, 308, 73/291, 325; 250/577; 318/482

[56] References Cited

U.S. PATENT DOCUMENTS

| | | | |
|---|---|---|---|
| 2,714,167 | 7/1955 | Herzog | 318/482 X |
| 3,238,839 | 3/1966 | Day, Jr. | 250/577 X |
| 3,314,292 | 4/1967 | Schulte et al. | 250/577 X |
| 3,358,510 | 12/1967 | Hoffmann et al. | 73/329 |
| 4,158,134 | 6/1979 | Martin et al. | 250/578 X |
| 4,345,468 | 8/1982 | Jackson | 73/329 X |
| 4,410,020 | 10/1983 | Lorenz | 250/577 X |
| 4,443,106 | 4/1984 | Yasuda et al. | 73/150 R X |
| 4,508,970 | 4/1985 | Ackerman | 73/293 X |

FOREIGN PATENT DOCUMENTS 1308050 2/1973 United Kingdom .
2107465 4/1983 United Kingdom .

Primary Examiner—Daniel M. Yasich
Attorney, Agent, or Firm—Dennison, Meserole, Pollack & Scheiner

[57] ABSTRACT

A liquid level sight gauge comprises at least one sight tube 10, 11, a scale 12 mounted adjacent such sight tube(s) and periscope means 13, 15, 16 including a reflective member 17 mounted on an optical carriage 16 movable along the sight tube and scale for viewing liquid levels within the sight tube over a predetermined metering range. Each sight tube, the scale, and the optical carriage are mounted within a substantially closed tubular casing. The sight tubes and scale are illuminated at least at the level of the optical carriage.

12 Claims, 7 Drawing Figures

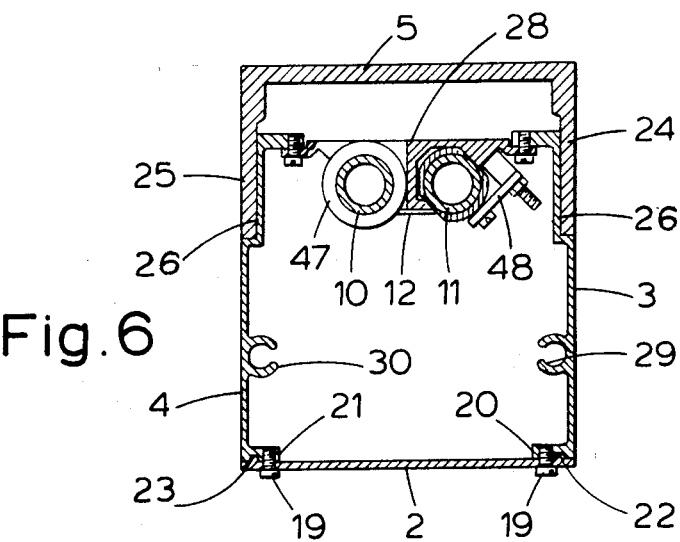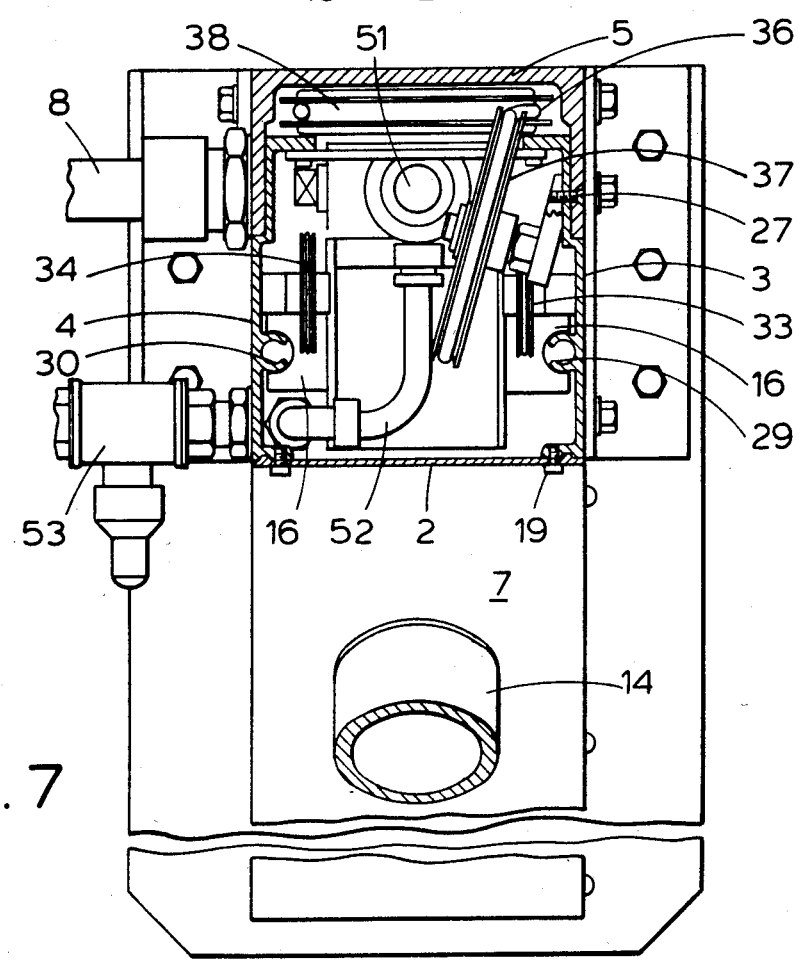

LIQUID LEVEL SIGHT GAUGE

This invention relates to a liquid level sight gauge comprising at least one sight tube, a scale mounted adjacent such sight tube(s) and periscope means including a reflective member mounted on an optical carriage movable along the sight tube and scale for viewing liquid levels within the sight tube over a predetermined metering range.

Such sight gauges are especially useful where a high degree of accuracy in monitoring is required in installations where it is inconvenient for an inspector physically to approach a sight tube at all points along its length. Particular examples of such installations are to be found in tank farms for the storage of dutiable liquors, where accurate liquid consumption checks have to be made at frequent intervals. By way of illustration, beer (which expression is used herein to denote fermented, non-distilled malt liquor generally) may be stored for bottling, canning or barreling in tanks some ten meters or more in height. Sight gauges of the kind referred to may be provided so that the necessary liquid level checks can be made from ground level without any need for ladders or catwalks which are expensive to install and maintain safely, and may in any event be inconvenient or difficult for Customs and supervisory personnel to negotiate.

Such sight gauges are known from British Patent Specifications Nos. GB 1 308 050, Michael Brian Potter, published Feb. 28, 1973, and GB 2 107 465 A, Otto Herman Varga, published Apr. 28, 1983 both in the name of Seetru Limited.

British Patent Specification No. GB 1 308 050 provides a liquid level sight gauge installation including in combination, a longitudinally extending sight tube, a graduated scale mounted to extend adjacent to and parallel with the sight tube, an optical magnifying and viewing device with adjustable focus such as a monocular or telescope and a first mirror, both mounted in fixed relation relative to said scale and including a second mirror mounted so as to be movable longitudinally over at least part of the scale, the mirrors being so oriented relative to the scale, each other and the viewing device that the scale may be viewed without parallax through said viewing device and the liquid level read off against any part of the scale over which the second mirror is movable.

British Patent Specification No. GB 2 107 465 A, published Apr. 27, 1983, provides a liquid level gauge installation including twin sight tubes extending upwardly side by side each sight tube being formed of at least two tube sections joined together end to end by glanded joints, the joints of the twin tubes being staggered longitudinally so that over any predetermined length of the gauge which includes a said joint, there exists alongside a section of transparent sight tube so that the level of the liquid may be read over the whole of that predetermined length of the gauge.

Sight gauges installed in accordance with one or other of these specifications have in general allowed satisfactory monitoring of liquid levels, but under certain viewing conditions, difficulties have been experienced in taking the necessary readings.

It is an object of the present invention to provide a liquid level sight gauge in which this disadvantage is obviated.

According to the present invention, there is provided a liquid level sight gauge comprising at least one sight tube, a scale mounted adjacent such sight tube(s) and periscope means including a reflective member mounted on an optical carriage movable along the sight tube and scale for viewing liquid levels within the sight tube over a predetermined metering range, characterised in that the or each sight tube, the scale and the optical carriage are mounted within a substantially closed tubular casing and in that means is provided for illuminating the sight tube(s) and scale at least at the level of said optical carriage.

When using a sight gauge according to the invention, readings may be taken at any time under constant viewing conditions which are quite independent of external conditions. Thus viewing in an outdoor installation will not be hampered by reflected sunlight or by adverse weather conditions such as rain or snow. The gauge will also be protected against the accumulation of dirt on the sight tube(s) and scale which again would hamper viewing. A further advantage afforded by the adoption of the present invention is that the or each sight tube is given protection against accidental damage. If the casing is opaque, as is preferred, another potential advantage manifests itself in that the liquid contained within a sight tube need only be exposed to light while level readings are being taken. It is well known that prolonged exposure to direct sunlight has a deleterious effect on certain liquids such as beers. Yet a further advantage is that the cased sight gauge can easily be lagged so that liquid in a sight tube is not exposed to adverse temperature levels. Thus for example in a winery in a warm climate, the gauge can be lagged to prevent the wine from becoming overheated, whereas in a brewery in a cold climate, the gauge can be lagged to prevent the beer from freezing.

The casing may be made of any convenient material, but it is particularly preferred that it should be of an aluminum alloy. By suitable choice of alloy, the construction of a structurally rigid casing with good corrosion resistance is facilitated. Such alloys can easily be extruded as sections suitable for forming the casing.

In preferred embodiments of the invention, said casing is built up lengthwise from a plurality of sections. This facilitates transport of the casing when the sight gauge is to be of considerable length, for example ten meters or even fifteen meters or more.

The or each casing section may be formed as a single piece, but it is preferred that the or each casing section has a front cover member, a pair of side members and a rear member. Such a construction can give easier access to the interior of the sight gauge should this be required for any reason, and can also make manufacture easier. In such embodiments, it is preferred that the joints between successive front cover members and successive rear members are lapped by the side members, and the joints between successive side members are lapped by a said front cover member and by a said rear member. This promotes strength in the casing structure as installed.

Preferably, adjacent casing members include interfitting recesses and protrusions whereby they are keyed together. This promotes accurate assembly of the different sections.

It is preferred that the or each said sight tube is formed by joining together a plurality of lengths of tubing. This makes handling of the sight tube prior to its final installation much easier than manipulating a single length. As an example, a sight tube 9 meters long could be built up using three 3-meter lengths of tubing.

Preferably, the or at least one such sight tube joint is a glanded expansion joint. This enables any differential thermal expansion between the sight tube and the structure to which it is mounted to be accommodated.

Advantageously, the or at least one such glanded expansion jointing member is so shaped as to direct liquid flow to flush its gland or glands on emptying or filling of the sight tube. This is particularly important for reasons of hygiene where the sight gauge is to be installed on a tank used for containing potable liquids.

A said sight tube could be made of a plastics material as is most usual, but it is preferred that the or each sight tube should be of glass, since this material has generally better aging properties, and is also preferable for reasons of hygiene. When using a glass sight tube, it has been found that it is not necessary to make use of expansion joints, because there is relatively little differential thermal expansion between the glass and a metal casing. What little there is can readily be accommodated using a slotted plate fixing technique. It is especially preferred that the or at least one sight tube is formed of glass tubing having flanged ends, such tubing being connected at each end to a next tubular member by means of a threaded collar captive on the glass tubing and via a resilient sealing ring whose internal surface is substantially flush with that of the glass tubing. A said next tubular member may be constituted by a second length of flanged glass tubing or, at an end of the sight gauge, by a connector pipe. The adoption of this feature gives better aging properties and facilitates cleaning.

Stability of the optical carriage is promoted when said optical carriage runs on guides within the casing, as is preferred, and it is also preferred that said guides are formed integrally with the casing. Such guides may for example be formed as ribs integral with side members of the casing, in which case, in addition to not requiring any independent fixing within the casing, they act as bracing members improving the structural strength of the casing.

The optical carriage may be moved along the sight gauge in a variety of ways, but it is preferred that at least one endless loop running between pulleys is provided within the casing for driving the optical carriage. This is a very simple way of giving good control over carriage movement.

If desired, the optical carriage may be provided with a graticle for sighting purposes so that the meniscus of liquid in a sight tube and the scale can be read without parallax.

There are several ways in which illumination may be provided at the level of the optical carriage. For example, some preferred embodiments of the invention include a light source at the base of the gauge and a collimator directing the light emitted up the casing for reflection onto the scale and sight tube by a reflective member mounted on the optical carriage. This affords the advantage that the light source is readily replaceable when necessary. However the use of such a system does require the presence of a collimator, thus adding to the cost of the installation, and it is generally preferred that the means provided for illuminating the sight tube(s) and scale comprises a light source movable with the optical carriage. The carriage can be moved to the base of the gauge for replacement of the light source should this be necessary.

In such embodiments it is advantageous that the light source is supplied with electric current via a cable. This is more convenient than mounting a battery on the optical carriage or making use of a sliding contact arrangement.

In the most preferred embodiments of the invention, the casing includes a plate member being behind the sight tube(s) and scale and spaced in front of the rear of the casing, and said cable is arranged to run over said plate member on a pulley to hang as a weighted loop between said plate member and the rear of the casing. This militates against tangling of the cable or fouling of the optical carrier during movement of the latter along the scale.

Preferably, the plate member serves to support the sight tube(s) and the scale.

The optical carriage may be moved along the scale manually, but preferably, a motor is provided within the casing for driving the optical carriage.

Advantageously, valve means is provided for enabling the or each sight tube to be selectively connected to and disconnected from a tank at least at its base. The adoption of this feature enables the sight tube to be drained independently of the tank for example for cleaning purposes, and also allows the adoption of other features which are themselves of considerable practical advantage.

Firstly, in such embodiments, the top of the or each sight tube is preferably connected to a conduit to enable a purging fluid to be introduced into such sight tube under pressure to force the content of such tube back into a tank to which it is connected. By way of example, air can be passed through such a purging conduit to force stored liquid back into the tank so that it is not wasted, whereafter the sight tube may be disconnected from the tank and a rinsing or sterilizing fluid may be passed through the sight tube, again via the purging conduit.

Secondly, in an installation incorporating such a liquid level sight gauge it is advantageous to provide conduit means for selectively connecting the gauge to at least the base of any one of a plurality of storage tanks, so that a single gauge can be used for monitoring liquid levels in more than one tank.

A preferred embodiment of the present invention will now be described in greater detail by way of example only with reference to the accompanying drawings in which:

FIG. 6 is a view on the line VI—VI of FIG. 4; and

FIG. 7 is a view on the line VII—VII of FIG. 5.

Figure 1:
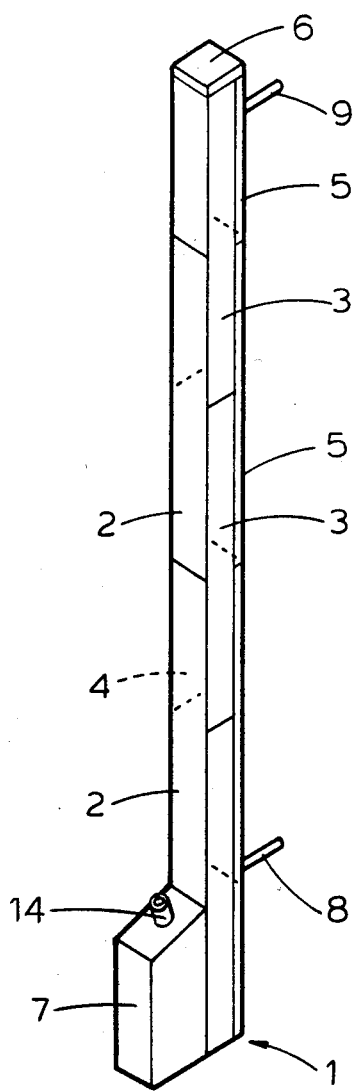
FIG. 1 is a perspective diagrammatic view of an embodiment of casing for a liquid level sight gauge according to this invention.
Figure 2:
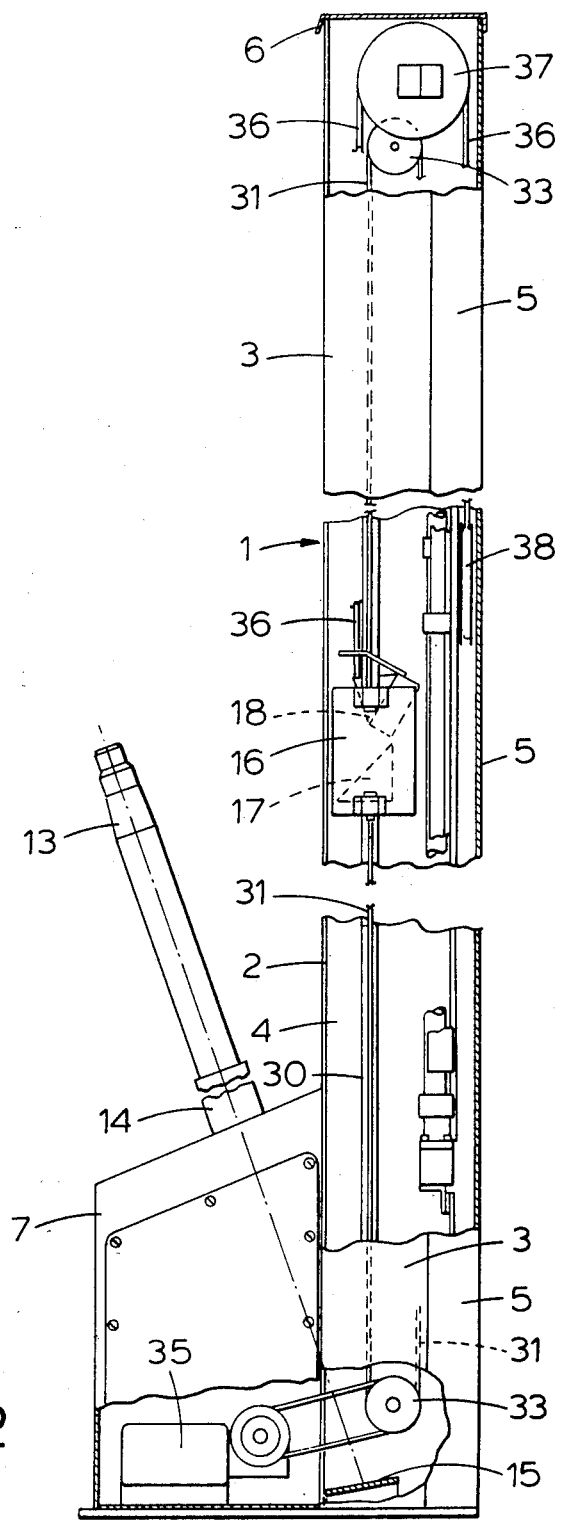
FIG. 2 is a vertical cross section of the sight gauge viewed from one side.
Figure 3:
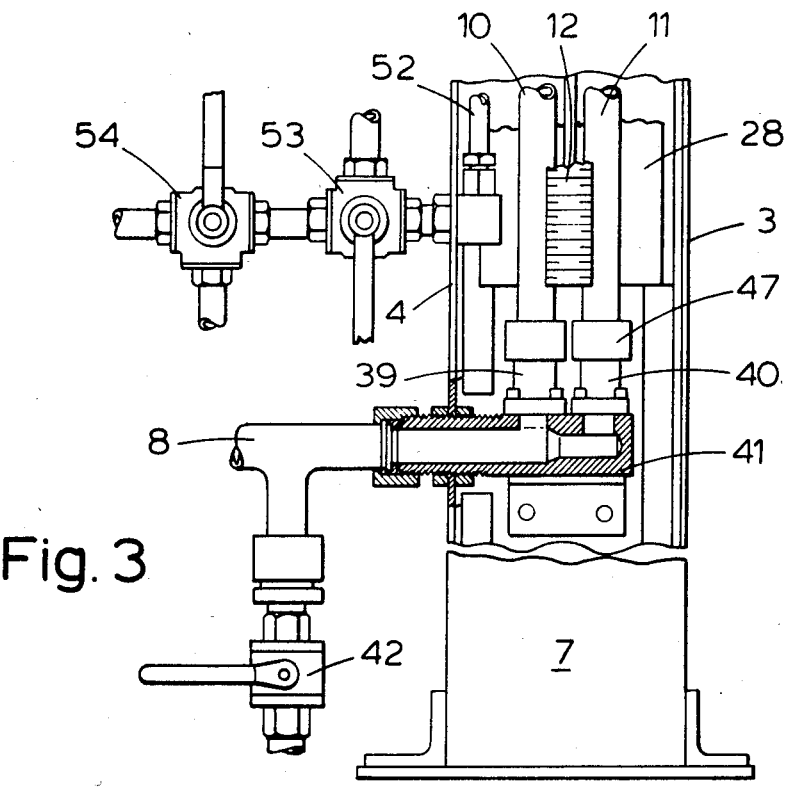
FIGS. 3, 4 and 5 are front elevations partly in cross section and to a larger scale respectively of the base, an intermediate level and the top of the sight tubes of the gauge shown in FIG. 2.

In FIGS. 1 and 2, a casing for a liquid level sight gauge 1 according to this invention comprises a plurality of front cover members 2, side members 3, 4 and rear members 5, a cap 6 and a drive housing 7. FIG. 1 also shows an inlet 8 leading from the base of the sight gauge for connexion to a tank whose contents are to be monitored, and an optional upper connector 9. The sight gauge comprises a pair of sight tubes 10, 11 mounted adjacent one another with a scale 12 mounted between and in front of them as is most clearly seen in FIGS. 3 to 5. A periscope is provided for viewing the scale 12 at any point along its length. The periscope comprises a telescope 13 (FIG. 2) detachably mounted in a fitting 14 on the drive housing 7. In this way, the same telescope can be used for viewing a number of different sight gauges. The telescope 13 is directed towards a mirror 15 at the base of the sight gauge which reflects the sight-line up the sight gauge parallel to the scale 12 to an optical carriage 16. The optical carriage 16 mounts a reflector 17 shown as a prism for directing the sight line onto the scale 12, together with a light source 18 for illuminating the scale 12 at the level sighted.

As shown in FIG. 1, the casing is built up lengthwise from a plurality of sections, and the joints between successive front cover members 2 and those between successive rear members 5 are lapped by the side members 3, 4, and the joints between successive side members 3, 4 are lapped by a said front cover member 2 and by a said rear member 5. These casing members are shown in cross section in FIGS. 6 and 7. From those Figures it will be seen that the front cover member is bolted by bolts 19 to flanges 20, 21 at the front of the side members 3, 4, and that the front cover member 2 is provided with a pair of ribs extending down its side margins which interfit with grooves such as 23 formed on the front faces of the flanges 20, 21. The rear member 5 shown is of channel cross section, and its side webs 24, 25 interfit with and are bolted to rebates 26, formed in the side members 3, 4 respectively using bolts such as 27 (FIG. 7). These interfitting recesses and protrusions help to key the casing structure together. A plate member 28 spans between the side members 3, 4 and serves to support the sight tubes 10, 11 and the scale 12. Guide rails 29, 30 are provided within the casing for the optical carriage 16 to run on, and in the embodiment illustrated, these guide rails 29, 30 are formed integrally with the side members respectively 3, 4 of the casing.

Endless wire loops 31, 32 attached to the optical carriage 16 and running between pairs of pulley wheels 33, 34 are provided for driving by a motor 35, or for hand winding, so that the optical carriage can be moved up and down the casing to sight liquid levels in the sight tubes. The light source 18 on the optical carriage 16 is supplied with electric current via a cable 36 which is arranged to run over the plate member 28 of the casing on a pulley 37 to hang as a loop weighted by a grooved wheel 38 between the plate member 28 and the base (rear) of the channel-shaped rear casing member 5.

Figure 4:
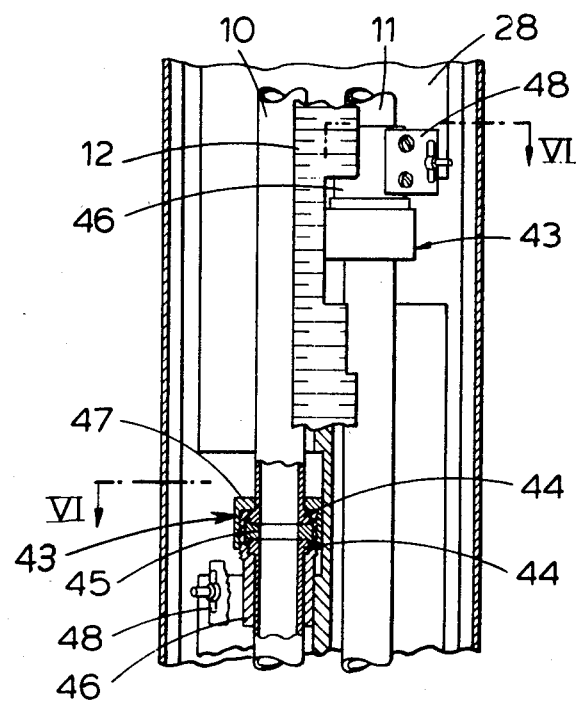

The sight tubes 10, 11 are each built up from several lengths of tubing so that the gauge has the desired length. At the base of the gauge, shown in FIG. 3, the sight tubes are connected via short tubular connectors 39, 40 to an inlet manifold 41 in turn connected to the inlet 8 leading to the tank whose contents are to be monitored. As an alternative to making a direct connexion with a single tank, the inlet 8 may be connected to a manifold from which a plurality of pipes lead, one to each of a plurality of tanks. By the provision of suitable valve gear, well known in the art, a single sight gauge can thus be used for monitoring liquid levels in all those tanks. An on/off valve (not shown) is provided on the inlet 8 for isolating the sight gauge from the tank, and a drain valve 42 is provided on that inlet 8 so that the liquid in the sight tubes can be drained off as desired. Joints such as 43 between the various lengths of sight tubing are staggered as shown in FIG. 4 so that a clear indication can be given along the whole length of the scale 12. The lengths of tubing have flanged ends 44 which abut against one another via a resilient sealing member 45 whose internal face is substantially flush with that of the lengths of tubing making up the sight tubes 10, 11, and the joint is held by an externally threaded sleeve 46 captive behind the flange 44 on one length of tubing and an internally threaded collar 47 similarly captive on the other length. The sight tubes are shown held to the plate member 28 by a screw clamp 48 bearing on the sleeve 46. The scale 12 may be cut away in the region of each tube joint as indicated in order to allow clearance for movement due to relative thermal expansion and contraction of the various parts of the sight gauge.

Figure 5:
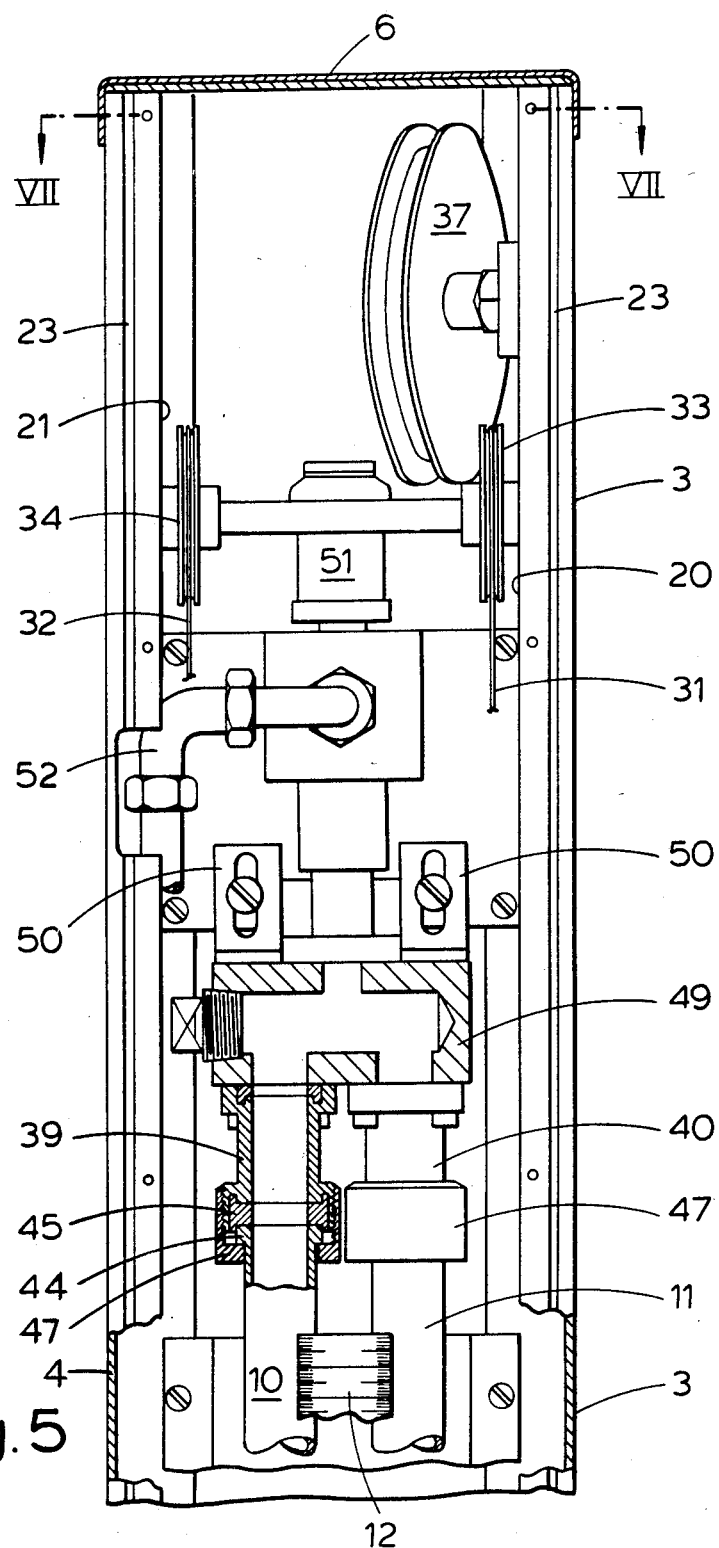

At their upper ends, as shown in FIG. 5, the tubes 10, 11 are connected to a head member 49 by tubular connectors 39, 40 suitably identical to those at the bottom. As with an intermediate joint 43 shown in FIG. 4, the tubes have flanged ends 44, behind which is held captive an internally threaded collar 47. This is screwed on to an external thread on the connectors 39, 40 to compress a resilient sealing ring 45. The head member 49 is secured to the casing using slotted plate connectors 50 to allow for thermal expansion and contraction of the various parts.

The head member 49 may either be connected to the tank containing the liquid whose level is to be monitored, or, as shown, it may be connected to a vacuum breaker 51 to allow filling and emptying of the sight tubes. A fluid purging line 52 is also connected to the head member 49. The purging line 52 is controlled by valves 53, 54, and may be used in various ways. By way of example, with the main tank valve (not shown) open and the drain valve 42 closed water may be forced through water valve 54 to force fluid in the sight tubes 10, 11 back into the tank. By closing the main valve and opening the drain valve 42, it is possible to flush the system with water through water valve 54, or, by opening valve 53, to flush the system with some other cleaning fluid, for example a sterilizing fluid. As an alternative, or in addition to water purging, a compressed air line can readily be connected to the head member so that fluid can be forced back into the tank by air rather than water.

I claim:

1. In a sight gauge for determining liquid level comprising in combination:

a least one sight tube, a scale mounted adjacent and parallel to said sight tube, and periscope means including a fixed telescope, a fixed mirror, an optical carriage, a mobile reflective member mounted on said optical carriage and means mounting said carriage for movement over and along the adjacent sight tube and scale for aligning said mobile reflective member along said sight tube for viewing liquid levels within the sight tube and for measuring the levels against the scale over a predetermined metering range:

the improvement comprising a substantially light-proof closed tubular casing formed of at least one cover member and enclosing the sight tube, scale and optical carriage;

means for illuminating the sight tube and scale within said casing, at least at the level of said optical carriage with the periscope means mounted in the casing for viewing the scale;

the sight tubing being formed of a plurality of lengths of tubing, each length of tubing forming the sight tube having flanged ends, said lengths of tubing being longitudinally aligned end-to-end and having aligned internal surfaces, and means connecting the flanged ends of adjacent lengths of tubing, said means connecting the flanged ends comprising a resilient sealing ring between the connected flanged ends, said resilient sealing ring having an internal surface substantially flush with the aligned internal surfaces of the lengths of tubing, and threaded collar means captive on said lengths of tubing.

2. A sight gauge according to claim 1, wherein said casing includes a plurality of sections in joined end-to-end alignment.

3. A sight gauge according to claim 2, wherein each section of closed tubular casing has a front cover member, a pair of side members and a rear member.

4. A sight gauge according to claim 3, including joints between successive front cover members, joints between successive rear members, and joints between successive side members longitudinally offset from the joints between said successive front cover members and said successive rear members.

5. A sight gauge according to claim 3, wherein adjacent casing members of each section include interfitting recesses and protrusions whereby they are keyed together.

6. A sight gauge according to claim 1, wherein the means for illuminating the sight tube and scale comprises a light source carried by and movable with the optical carriage and means for supplying electric current to said light source via a cable.

7. A sight gauge according to claim 6, wherein the casing includes a plate member behind the sight tube and scale and spaced in front of the rear of the casing, a pulley on said plate member, said cable running over said pulley and weight means on said cable to the opposite side of said pulley from said light source and between said plate member and the rear of the casing.

8. A sight gauge according to claim 7, wherein the plate member supports the sight tube and the scale.

9. A sight gauge according to claim 1, including valve means for selectively communicating said sight tube with a source of liquid to be measured.

10. A sight gauge according to claim 9, including means for selectively introducing a purging fluid into said sight tube under pressure, whereby the measured contents thereof may be discharged.

11. A sight gauge according to claim 1, wherein two sight tubes are provided and extend side by side over a predetermined vertical distance, said scale being located between said sight tubes and extending over said predetermined vertical distance, whereby levels in both said tubes can be measured against said scale employing said periscope means.

12. A sight gauge according to claim 11, wherein each of said pair of sight tubes includes, over said predetermined vertical distance, a plurality of lengths of tubing with joint forming connected ends, and wherein the joints between adjacent lengths of tubing are located at different vertical levels in the two respective sight tubes.

* * * * *